United States Patent
Hanson

(10) Patent No.: US 7,073,165 B2
(45) Date of Patent: Jul. 4, 2006

(54) METHOD AND APPARATUS FOR FACILITATING EXECUTION OF APPLICATIONS ACCEPTING LOCAL PATH AND URL SPECIFIED FILE PARAMETERS

(75) Inventor: David R. Hanson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 619 days.

(21) Appl. No.: 09/767,768

(22) Filed: Jan. 23, 2001

(65) Prior Publication Data

US 2002/0144238 A1 Oct. 3, 2002

(51) Int. Cl.
*G06F 9/44* (2006.01)
*G06F 9/45* (2006.01)

(52) U.S. Cl. ..................... 717/120; 717/140

(58) Field of Classification Search ........ 717/140–143, 717/162–167, 139; 709/203, 217, 219, 231
See application file for complete search history.

(56) References Cited

U.S. PATENT DOCUMENTS

| | | | | |
|---|---|---|---|---|
| 5,778,231 | A * | 7/1998 | van Hoff et al. | 717/143 |
| 5,950,008 | A * | 9/1999 | van Hoff | 717/139 |
| 6,279,151 | B1 * | 8/2001 | Breslau et al. | 717/140 |
| 6,654,794 | B1 * | 11/2003 | French | 709/217 |
| 6,711,619 | B1 * | 3/2004 | Chandramohan et al. | 709/229 |

OTHER PUBLICATIONS

Sanford Morton, Reading CGI Data: url-encoding and the CGI protocol, Aug. 16, 1998.*
Jennifer Niederst, Web Design in a Nutshell, Jan. 1999, O'Reilly & Associates, Inc., First Edition, p. 49.*
Krintz et al., "Reducing the overhead of dynamic compilation", Dec. 6, 2000.*
Krintz et al., "Overlapping Execution with Transfer Using Non-Strict Execution for Mobile Programs", Oct. 1998.*
Krintz et al., "Reducting Tranfer Delay Using Java Class File Splitting and Prefetching", 1999.*
Gillmor, S., "Want to construct and maintain web sites and web-based applications? We look at seven tools ready to help you.," Toolkits for Building Web Applications, *Byte Software Lab Report*, http://www.byte.com/art/9712/se11/art3.htm, Dec. 1997, 22(12), 17 pages.
Schmidt D.C., "Using design patterns to develop reusable object-oriented communication software," *Communications of the ACM*, Oct. 1995, 38(10), LAC 17449888, 65-74.

* cited by examiner

*Primary Examiner*—Kakali Chaki
*Assistant Examiner*—Trenton J. Roche
(74) *Attorney, Agent, or Firm*—Woodcock Washburn LLP

(57) ABSTRACT

A compiler command is specified and a compiler application or other application is executed. A file name is passed to the application identifying data file input. Special net I/O functionality is included in the net I/O API. This functionality determines whether the file identifier is a URL. If it is not a URL, then standard C API's are used to open, read, and write the file specified. If the identifier is a URL, then Win32 API functions are used to access the Internet and to open, read, and write the file. Thus, the application executes successfully without a download of the remotely stored file input prior to execution.

18 Claims, 5 Drawing Sheets

FIGURE 4

| URL | Scheme | Authority | Path | Query |

| URL | http:// | www.cs.princeton.edu | /software/cii/pkg/src/atom.c | |

METHOD AND APPARATUS FOR FACILITATING EXECUTION OF APPLICATIONS ACCEPTING LOCAL PATH AND URL SPECIFIED FILE PARAMETERS

TECHNICAL FIELD

The present invention relates generally to the field of software applications executed by computer processing devices. More specifically, the present invention relates to that field concerned with improving the efficiency and flexibility of such software applications.

BACKGROUND OF THE INVENTION

In recent years, with the extensive use and development of the Internet and the World Wide Web, the public has benefited in many ways. Amongst the primary beneficiaries of this Internet technology are those individuals who develop and/or use computer software. In particular, given the ready accessibility of a myriad of file resources located on the Internet, data required for locally executed applications can often be copied from a remote server rather than created locally.

Thus, for example, the extent of sharing of software development resources has increased. In particular, academic institutions and other community oriented technological groups frequently post the source code for commonly executed procedures and utilities on the web, thus saving members of the developer community time that would otherwise be required to write such code from scratch. At the time of the writing of this specification, for example, the C Interfaces and Implementation (CII) library at the Princeton University web site provides a set of Application Programming Interfaces (API's) useful in a wide variety of applications.

As a specific example, a hypothetical developer using the "C" programming language might want to use the CII "Atom" interface as part of the compiled source code for a "C" based application being developed. Fortunately for the developer, corresponding header and source files are located at:

http://www.cs.princeton.edu/software/cii/pkg/include/atom.h; and
http://www.cs.princeton.edu/software/cii/pkg/src/atom.c.

Thus, the developer can access and compile such useful interfaces without expending extensive time and effort writing programming code already authored by others.

Unfortunately, while enormously helpful, the use of data files stored on the Internet as parameters in locally executed applications (e.g., the compiler application noted above) is associated with certain drawbacks. In particular, in order to use stored Internet files, the files must generally first be downloaded to a local storage medium. Such downloading generally requires a separate step manually initiated by the developer or other software user.

For example, returning to the example described above, since compilers typically do not accept URL specified files as parameters, in order to compile the source and header files atom.c and atom.h, the developer must first copy the files to a local directory (e.g., via an FTP protocol utility). Only when the source and header files have been downloaded can the developer compile the shared source code (e.g., by causing execution of a compile command such as "cl /FeMyApp.exe main.c atom.c"). Furthermore, to ensure the latest version of the CII Atom interface is used, the developer must complete such a download each time the interface is needed for a given compilation, resulting in significant inconvenience.

Thus, what is needed is a way for compilers and other locally executed software applications using data files stored on the Internet to access such files automatically and without creating extra work for the developers and users.

SUMMARY OF THE INVENTION

The present invention satisfies this need. In particular, the present invention incorporates within the software application, input/output functionality successfully accepting both local directory path specified, and Uniform Resource Locator ("URL") specified, file parameters. Specifically, in accordance with the present invention, the software includes a procedure whereby a file name is first determined to either constitute or not constitute a URL. If the name is determined not to constitute a URL, conventionally known Input/Output procedures for locally stored files are executed. Such procedures are of the type commonly included in Application Programming Interfaces ("API's") applicable to various programming languages and platforms. Otherwise, if the identifier is determined to be a URL, a different set of Input/Output procedures, designed to process data streams stored on the World Wide Web, are executed.

BRIEF DESCRIPTION OF THE DRAWINGS

FIG. 4 depicts a standard URL structure that may be used to determine whether a file name is, or is not, a remote file stored on the World Wide Web in accordance with an aspect of the invention.

DETAILED DESCRIPTION OF THE INVENTION

Overview

The present invention allows applications to successfully accept local path specified, as well as URL specified, I/O file parameters. Thus, during execution it appears to the application user (e.g., the developer in the case of a compiler application) as if both local and web-based files are stored on the local storage medium.

Although this invention is described with respect to specific computing implementations, the scope of the present invention is by no means limited to those contexts.

Exemplary Operating Environment

Figure 1:
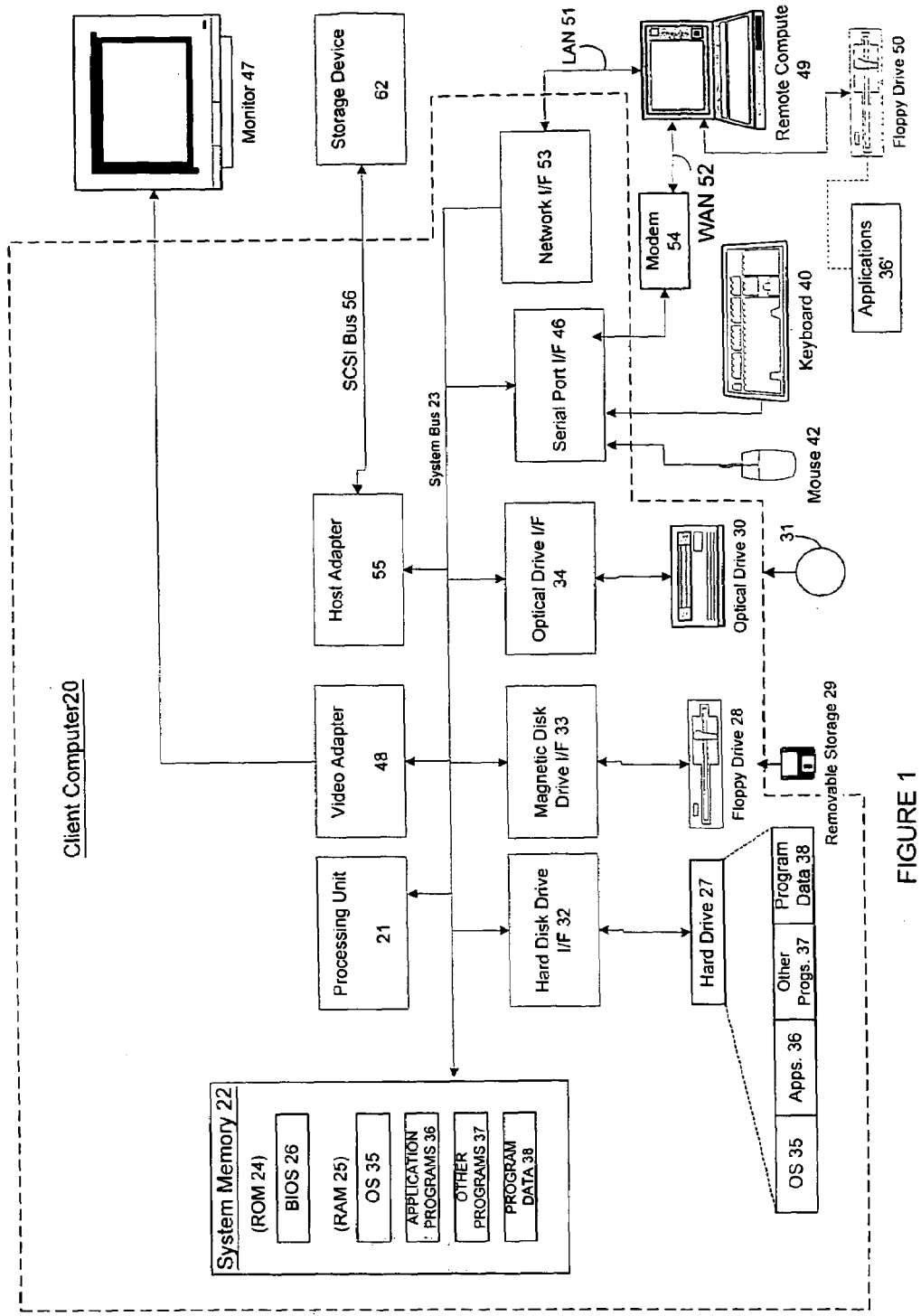
FIG. 1 is a block diagram representing a computer system in which aspects of the present invention may be incorporated.
Figure 2:
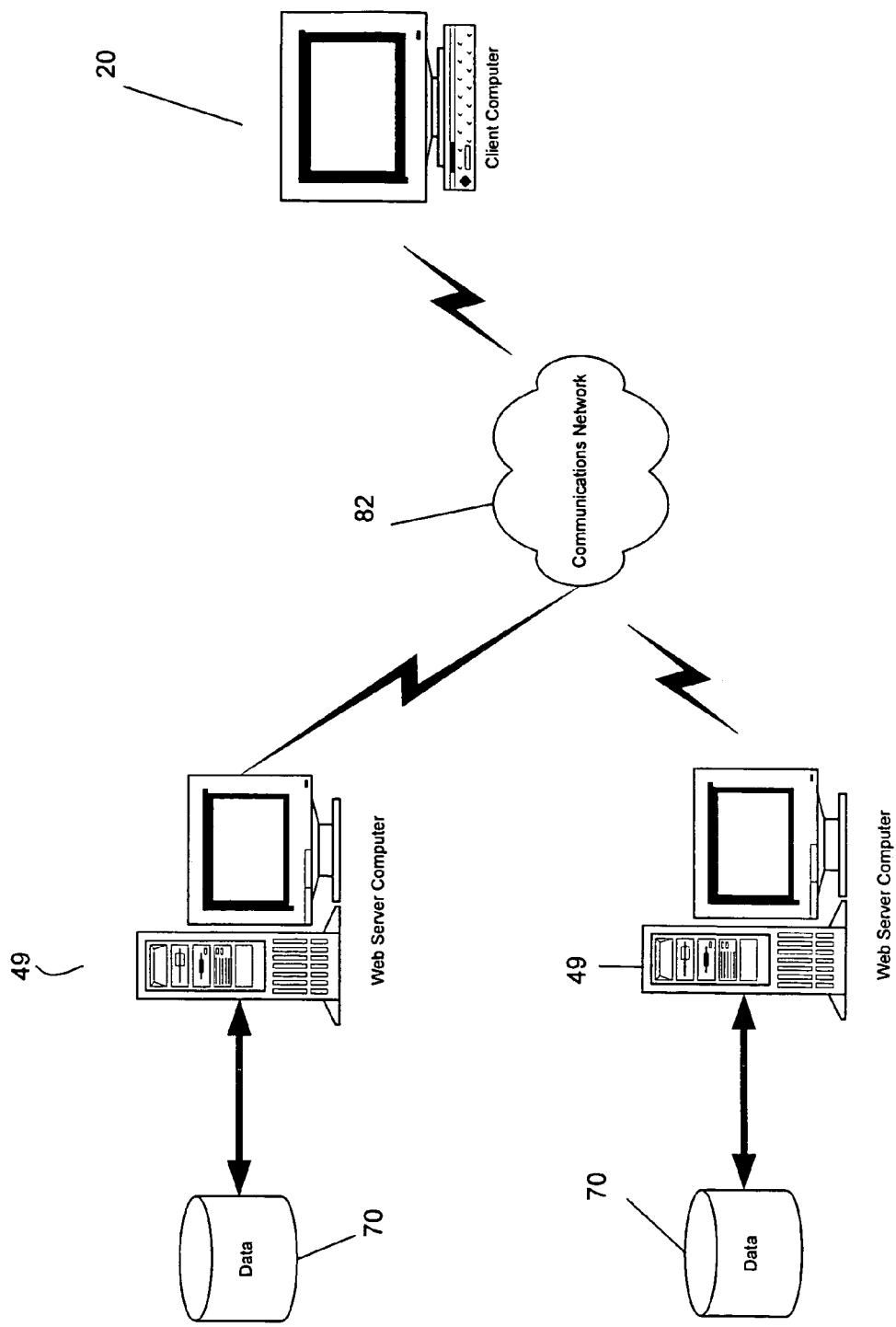
FIG. 2 is a high level view of a network environment in which an embodiment of the present invention may be implemented.

FIG. 1 and the following discussion are intended to provide a brief general description of a suitable computing environment in which the invention may be implemented. The invention will be described in the general context of computer-executable instructions, such as program modules, being executed by a computer, such as a PC client workstation capable of issuing requests to a web server. However, those skilled in the art will appreciate that the invention may be practiced with other computer system configurations, including hand held devices, multi-processor systems, microprocessor-based or programmable consumer electronics, network PCs, minicomputers, mainframe computers and the like.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Further, as used herein, the term "computer readable medium" includes one or more instances of a media type (e.g., one or more floppy disks, one or more CD-ROMs, etc.).

Generally, program modules include routines, programs, objects, components, data structures and the like that perform particular tasks or implement particular abstract data types. A number of such program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. A monitor 47 or other type of display device is also connected to the system bus 23 via an interface, such as a video adapter 48. In addition to the monitor 47, personal computers typically include other peripheral output devices (not shown), such as speakers and printers.

A personal computer 20 may operate in a networked environment using logical connections to one or more remote computers, such as a remote computer 49. The remote computer 49 may be another personal computer, a server, a router, a network PC, a peer device, a web server or other common network node, and typically includes many or all of the elements described above relative to the personal computer 20, although only a storage device 50 has been illustrated in FIG. 1. The logical connections depicted in FIG. 1 include a local area network (LAN) 51 and a wide area network (WAN) 52. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. It will be appreciated that the network connections shown are exemplary and other means of establishing a communications link between the computers may be used.

Where the WAN environment is the Internet (which can also be viewed a number of WANs), various protocols may be used to exchange commands and data between computers connected in the WAN. The protocols include the File Transfer Protocol (FTP), the Hyper Text Transfer Protocol (HTTP) and the Gopher document protocol. Generally, files stored on the web can be downloaded from a web server 49 using the FTP functionality of an FTP software module executing on the client workstation 20 processor 21. FIG. 3 shows a high level view of a network environment in which an embodiment of the present invention may be implemented.

Figure 3A:
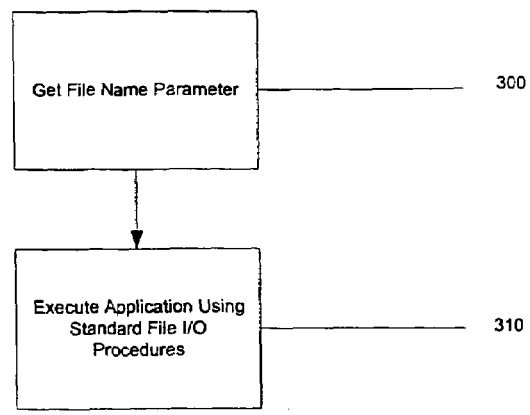
FIG. 3A is a high level flow chart depicting the conventional execution of a software application performing I/O operations on a locally stored file.
Figure 3B:
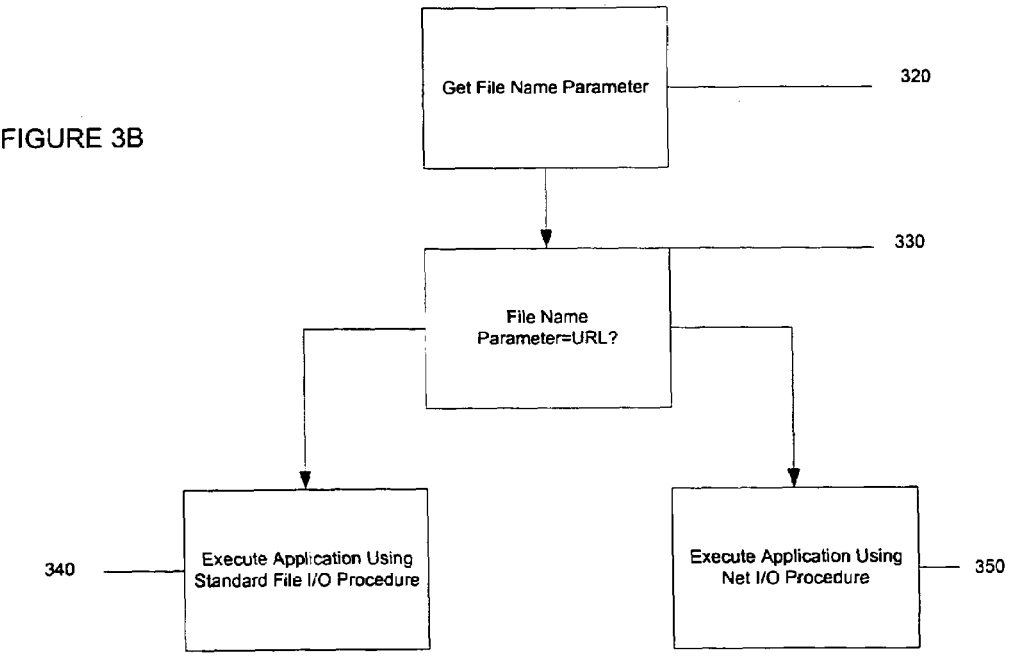
FIG. 3B is a high level flow chart depicting the execution of a software application successfully performing I/O operations on either a locally stored file, or URL specified remote file, in accordance with an embodiment of the present invention.

Exemplary Software Execution Accepting URL Specified or Local Path Specified File Parameters Turning now to FIGS. 3A and 3B, they are high level flow charts that show the processing of a received file name parameter during application execution in accordance with prior art, and in accordance with an embodiment of the present invention, respectively. For example, FIG. 3A depicts a conventionally known application execution.

In Step 300, an application 36 commences execution on a client computer 20 processor 21. During execution, the application 36 processes and manipulates input in the form of file data 38. The application 36 typically identifies and locates the file 38 by accepting a file name parameter that either explicitly or implicitly includes a local directory path indicating where the file data 38 is stored. File name and location conventions are typically determined by the Operating System 35, such as for example a Windows 2000® operating system, running on the client 20.

Having accepted the file name parameter, in Step 310, the application 36 can commence processing the file data 38. Initially however, the file 38 identified must be processed to perform low level I/O processing. Such I/O processing is typically coded in procedures contained in the API's provided for particular computing environment platforms or in the I/O libraries used in various object oriented programming language implementations (e.g., C, C++, Java etc.) The procedures are thus typically accessible to developers and constitute building blocks of the program code corresponding to the software application 36 executed in Step 300.

Appendix A includes conventionally known source code for such procedures. These procedures conventionally include: (1) an "Open" procedure for accessing a file and opening a data stream; (2) a "Read" procedure for reading the data stream; (3) a "Write" procedure for writing a data stream; and (4) a "Close" procedure for closing an open data stream.

For example, if the application 36 is a compiler application as in the example described above, low level "Open" and "Read" procedures accepting the file name parameter and perform low level I/O processing on the local file 38 identified. Once the stream of file data 38 is opened—i.e., in this example a stream of source code—compilation processing of the file data 38 is executed and completed.

By contrast, the execution of an application coded in accordance with an embodiment of the present invention is shown in FIG. 3B. Again, in Step 320, an application 36 commences execution on a client computer 20 processor 21. However, upon accepting a file identifier parameter, in Step 330, the application 36 first determines whether or not the file name parameter is or is not a URL.

The determination of whether the file name parameter is nor is not a URL is made possible because URL's are structured according to particular syntax. In particular, the conventionally known W3C standard specifies what constitutes a valid URL and explains its semantics.

For example, FIG. 4 is a high level view of the overall structure of a URL in accordance with that standard. Generally, as depicted in FIG. 4, a URL consists of four components: a Scheme component, an Authority component, a Path component and a Query component. These components are illustrated in FIG. 4 using the following URL as an example:

http://www.cs.princeton.edu/software/cii/pkg/src/atom.c

The scheme component identifies the scheme used to access a remotely stored file specified by the URL. For instance, the "http://" portion of the above URL indicates that http protocols must be used to access the file.

The authority component typically specifies an Internet-based server 49 that constitutes the naming authority providing a reference that gives meaning to the location path specified in the remainder of the URL. For example, the "www.cs.princeton.edu" portion of the above URL indicates a particular server 49 having a particular IP address as a naming authority.

The Path component contains location data, specific to the naming authority (i.e., the server 49), locating the URL specified file. For example, the "/software/cii/pkg/src/atom.c" portion of the above URL specifies the path on the server 49 of the "atom.c" source code 38 identified by the above URL.

Finally, the query component is a string of characters providing parameters that can be passed with and executed by the URL specified file assuming the file is in executable form (e.g., an ASP or CGI script file). In the currently considered URL, there is no query component (although the application of the presently described embodiment includes functionality checking for a query component).

Returning to Step 330 of FIG. 3B, the application determines whether the passed file name parameter is a URL checking for Scheme, Authority, Path and Query components and other URL specific characteristics.

If it is determined that the passed file identifier parameter is not a URL, then, in Step 340, processing continues as in FIG. 3A. That is, continuing with the compiler example, the file 38 identified is processed with the standard "Open" and "Read" I/O available for locally stored files, and is subsequently compiled.

However, if it is determined that the passed file identifier parameter is a URL, then, in Step 350, the file 38 identified by the URL is processed with revised "Open" and "Read" I/O procedures customized to data files stored on the web. Sample source code for such revised net I/O procedures are set forth in Appendix B. In a preferred embodiment of the present invention, the net I/O functions are contained in Win 32 platform API procedures for accessing the Internet. (Win32 API procedures require a Windows® operating system platform). Thus, during program 36 execution a stream of file data 38—i.e., in this example a stream of "atom.c" source code—is opened and read over web links 82 using web protocols. Once downloaded or partially downloaded, compilation of the source code file data 38 can commence.

Thus, since the compiler application 36 has integrated net I/O functionality, no download of the "atom.c" source code is required prior to execution.

Note that with respect to FIG. 3B above, while an embodiment of the present invention is described with respect to a compiler application, the present invention is in no way limited compilers. For example, the application may be a word processing application that, during execution, accepts a file parameter identifying an existing word processing document file stored on a web server 49. The document can thus be opened and edited. The application may be financial tracking and calculating software that accepts an identifier specifying a remotely stored file of financial data that can then be updated with recently completed financial transactions.

Further, because of the applicability of the present invention to a wide variety of applications, in a preferred embodiment of the present invention, the functionality described, particularly with respect to steps 330 and 350 of FIG. 3B, is incorporated in software or API's ensuring wide availability of the features of the present invention to many software developers. For example, this functionality can be provided either as part of I/O libraries included with programming language implementations or in existing operating system 35 API's. (Currently, Operating systems provide separate API's for accessing the Internet, rather than including such functionality in standard file I/O procedures). Where the functionality is embedded in operating systems 35 or operating system 35 tools, every user of that platform could potentially benefit.

Figure 5A:
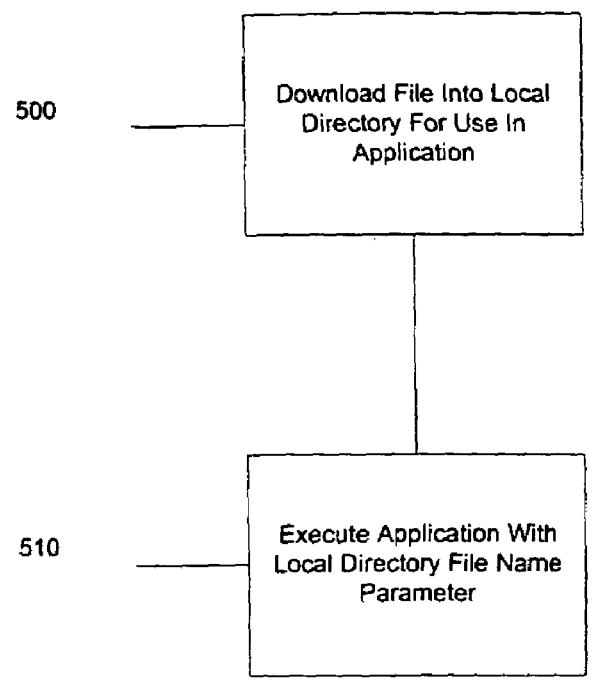
FIG. 5A is a high level flow chart depicting a well known two-step process for executing a software application using remotely stored data.

Having described the I/O functionality of an application 36 in accordance with aspects of the present invention, the benefits of the present invention are now illustrated with reference to FIGS. 5A and 5b. FIG. 5A, it shows the execution of a standard application using a file input in accordance with the prior art. In Step 500, the file being passed (e.g., the "atom.c" source code) to the application 36 is downloaded to the client 20 system. In Step 510, the application 36 is executed using the downloaded file data 38 as input. For example, in the MS Visual C (Microsoft Corporation) program development environment, the specification and line entry of the command "cl /FeMyApp.exe main.c atom.c" causes compilation of the source code data corresponding to the "atom.c" file name.

Thus the prior art compilation requires a two-step process on the user's part. If, by contrast, the source code had not been downloaded, the compilation would not complete successfully. That is, if the file name parameter passed to an application is a URL, the application would generally be unable to find the URL specified file and would prematurely terminate the compilation returning an error.

Figure 5B:
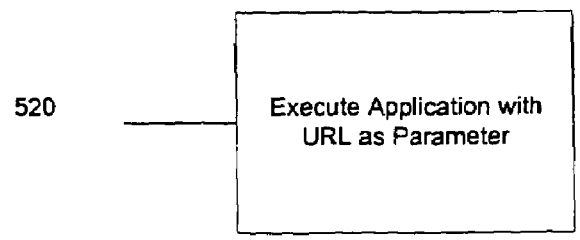
FIG. 5B is a high level flow chart depicting a one step process for executing a software application using remotely stored data in accordance with an embodiment of the present invention.

By contrast, FIG. 5B depicts an application 36 execution wherein the application 36 incorporates net I/O functionality in accordance with an embodiment of the present invention. The execution is a one step process wherein the developer merely specifies a command such as "cl /FeMyApp.exe main.c http://www.cs.princeton.edu/software/cii/pkg/src/atom.c" Prior download of the "atom.c" source code is not required for successful compilation.

Thus, the present invention provides benefits program developers as well as any software user. While the invention has been described above in detail and with reference to specific embodiments thereof, it will be apparent to one skilled in the art that various changes and modifications can be made therein without departing from the spirit and scope thereof. Therefore, the scope of the invention should be understood with reference to the following claims.

APPENDIX A

```
#ifndef IO_H
#define IO_H
#include <stdio.h>
/* $Id: io.h,v 1.1 2000/07/11 20:06:20Z drh Exp drh $ */
#define IO_T T
typedef struct T *T;
extern T IO_open(const char *file, const char *mode);
extern int IO_close(T stream);
extern int IO_flush(T stream);
extern int IO_getc(T stream);
extern int IO_putc(int c, T stream);
extern int IO_read(char *ptr, size_t size, size_t count, T stream);
extern int IO_write(char *ptr, size_t size, size_t count, T stream);
extern T IO_stdin;
extern T IO_stdout;
extern T IO_stderr;
#undef T
#endif
#define IO_T T
/* Standard file I/O */
struct file   {
    struct T stream;
    FILE *fp;
};
static int fileclose(T stream) {
    FILE *fp = ((struct file *)stream)->fp;
    return fclose (fp);
}
static int fileflush(T stream) {
    FILE *fp = ((struct file *)stream)->fp;
    return fflush(fp);
}
static int fileread(char *ptr, size_t size, size_t count, T stream)   {
    FILE *fp = ((struct file *)stream)->fp;
    return fread(ptr, size, count, fp);
}
static int filewrite(char *ptr, size_t size, size_t count, T stream)
{
    FILE *fp = ((struct file *)stream)->fp;
    return fwrite(ptr, size, count, fp);
}
static struct methods fileio = { fileclose, fileflush, fileread, filewrite };
static T fileopen(const char *file, const char *mode) {
    FILE *fp = fopen(file, mode);
    if (fp) {
        struct file *stream = malloc(sizeof *stream);
        if (stream)    {
            stream->stream.methods = &fileio;
            stream->fp = fp;
            return (T)stream;
        }
        fclose(fp);
    }
    return NULL;
}
```

APPENDIX A-continued

```
static struct file
    stdinput = { &fileio, stdin },
    stdoutput = { &fileio, stdout },
    stderror = { &fileio, stdout };
T IO_stdin = (T)&stdinput, IO_stdout = (T)&stdoutput, IO_stderr = (T) &stderror;
```

APPENDIX B

```
/* Net I/O */
#ifdef WIN32
#include <windows.h>
#include <wininet.h>
static HINTERNET hSession = NULL;
struct net   {
        struct T stream;
        HINTERNET hFile;
        char buffer[128];
        char *bp, *limit;
};
static void netcleanup (void)    {
        if (hSession)
                InternetCloseHandle (hSession);
        hSession = NULL;
}
static int netclose(T stream) {
        HINTERNET hFile = ((struct net *)stream)->hFile;
        return InternetCloseHandle(hFile) == TRUE ? 0 : EOF;
}
static int netflush(T stream)   {
        return EOF;
}
static int netread(char *ptr, size_t size, size_t count, T stream)   {
        struct net *ns = (struct net *)stream;
        size_t n = count*size;
        if (ns->bp < ns->limit)    {
                for ( ; ns->bp < ns->limit && n > 0; n--)
                        *ptr++ = *ns->bp++;
                return (count*size - n)/size;
        }
        if (InternetReadFile(ns->hFile, ptr, n, &count) == FALSE)
                count = 0;
        return count;
}
static int httpError(struct net *stream) {
        int count;
        char *bp = stream->bp = stream->limit = stream->buffer;
        if (!InternetReadFile (stream->hFile, stream->bp, sizeof stream->buffer, &count))
                return 0;
        stream->limit = stream->buffer + count;
        for ( ; bp < stream->limit; bp++)
                if (*bp == '<' && (strncmp(bp, "<title>", 7)
== 0 || strncmp(bp, "<TITLE>", 7) == 0))   {
                        int code = 0;
                        for (bp += 7; bp < stream->limit && isspace(*bp); )
                                bp++;
                        while (bp < stream->limit && isdigit(*bp))
                                code = 10*code + (*bp++ - '0');
                        if (code >= 401 && code <= 505)
                                return 1;
                        return 0;
                }
        return 0;
}
```

APPENDIX B-continued

```
static T netopen(const char *file, const char *mode) {
        static struct methods netio = {netclose, netflush,
netread, nullwrite };
        HINTERNET hFile;
        if (hSession == NULL) {
            hSession = InternetOpen("",
INTERNET_OPEN_TYPE_DIRECT, NULL, NULL, 0);
            if (hSession);
                atexit(netcleanup);
        }
        if (strspn(mode, "RrbB") != strlen(mode))
            return NULL;
        hFile = InternetOpenUrl(hSession, file, NULL, 0, 0, 0);
        if (hFile)    {
            struct net *stream = malloc(sizeof *stream);
            if (stream) {
                stream->stream.methods = &netio;
                stream->hFile = hFile;
                if (httpError (stream) == 0)
                    return (T)stream;
                IO_close((T)stream);
                return NULL;
            }
            InternetCloseHandle (hFile);
        }
        return NULL;
}
#else
static T netopen(const char *file, const char *mode) {
        return NULL;
}
#endif
int IO_close(T stream)    {
        int code;
        assert(stream);
        code = (*stream->methods->close) (stream);
        free(stream);
        return code;
}
int IO_flush(T stream) {
        assert(stream);
        return (*stream->methods->flush) (stream);
}
int IO_getc(T stream) {
        char c;
        assert(stream);
        if ((*stream->methods->read) (&c, 1, 1, stream) == 1)
            return (unsigned)c;
        return EOF;
}
int IO_putc(int c, T stream)    {
        char buf = c;
        assert(stream);
        if ((*stream->methods->write) (&buf, 1, 1, stream) == 1)
            return c;
        return EOF;
}
int IO_read(char *ptr, size_t size, size_t count, T stream) {
        assert(ptr);
        assert(stream);
        return (*stream->methods->read) (ptr, size, count,
stream);
}
int IO_write(char *ptr, size_t size, size_t count, T stream)   {
        assert(ptr);
        assert(stream);
        return (*stream->methods->write) (ptr, size, count,
stream);
}
static int isUrl(const char *path) {
        return strstr(path, "://") != NULL;
}
T IO_open(const char *file, const char *mode) {
        const char *s;
        assert(mode);
        for (s = mode; *s; s++)
            if (strchr("AaBbRrWw+", *s) == NULL)
                return NULL;
```

APPENDIX B-continued

```
        if (file == NULL)
            return nullopen(file, mode);
        else if (isUrl(file))
            return netopen(file, mode);
        else
            return fileopen(file, mode);
}
```

What is claimed is:

1. A computer-based method for compiling a source code file on a client computer, the source code file being stored on a remote server computer and being accessible via web protocols, the method comprising:
    (a) accepting a manually specified compile command, the compile command including a set of parameters, the set of parameters including an identifier corresponding to the source code file; and
    (b) executing by a compiler entirely stored on the client computer a compile procedure corresponding to the compile command, the compile procedure effecting conversion of the source code file into a file executable on the client computer,
    wherein step (b) includes downloading the source code file from the remote server computer to the client computer using web protocols without executing a manually specified download command, and the conversion of the source code file into a file executable on the client computer by the compiler begins before the source code file has been completely downloaded to the client computer, and
    further wherein the identifier corresponding to the source code comprises an identifier of executable code, and downloading the source code file comprises transmitting to the remote server the identifier corresponding to executable code and at least one parameter used by the executable code to identify the source code.

2. The computer-based method of claim 1 wherein the source code file is "C" source code.

3. The computer-based method of claim 2 wherein the identifier corresponding to the source code file is a URL.

4. A computer-based method for executing an application on a client computer, the application functioning to process file data stored on a remote server computer, the file data stored on the remote server computer being accessible via web protocols, the method comprising:
    (a) accepting a manually specified execute command for an application entirely stored on the client computer, the execute command including a set of parameters, the set of parameters including an identifier corresponding to the file data, wherein the data file is not executable; and
    (b) executing a procedure corresponding to the execute command, the procedure manipulating the file data on the client computer by the application,
    wherein step (b) includes downloading the file data from the remote server computer to the client computer using the web protocols without executing a manually specified download command, and the manipulation of the file data on the client computer by the application begins before the file data has been completely downloaded to the client computer, and
    further wherein downloading the file data comprises transmitting to the remote server computer an identifier of executable code and at least one parameter used by the executable code to derive the file data.

5. The computer-based method of claim 4 wherein the identifier corresponding to the file data is a URL.

6. The computer-based method of claim 4 wherein the application is a compiler.

7. The computer-based method of claim 4 wherein the application is a word processor.

8. The computer-based method of claim 4 wherein the application is financial tracking software.

9. A computer system including a processor, memory associated with the processor, and a storage medium capable of storing a data file, the data file having a corresponding file identifier, the system comprising:
   (a) an application software component comprised of instructions in the memory and executable by the processor, the application software component functioning to process the data file, wherein the application software component is stored entirely at the computer system and the data file is not executable; and
   (b) an I/O software component comprised of instructions in the memory and executable by the processor, the I/O software component functioning to accept the file identifier, to determine whether the file identifier is a URL and, if so, to retrieve the data file from a remote server using the file identifier and, if not, to retrieve the data file from the storage medium using the file identifier,
   wherein the application software component processing the data file begins before the data file has been completely retrieved from the remote server if it is determined that the file identifier is a URL,
   wherein said file identifier identifies executable code, and
   wherein said I/O software component functioning to retrieve the data file from a remote server using the file identifier operates by transmitting to the remote server said file identifier with at least one parameter, said at least one parameter being executable by the executable code identified by said file identifier.

10. The computer system of claim 9 wherein source code corresponding to the I/O software component is included in a programming implementation I/O API stored on the storage medium.

11. The computer system of claim 9 wherein source code corresponding to the I/O software component is included in an Operating System I/O API stored on the storage medium.

12. The computer system of claim 11 wherein the Operating System is a Windows operating system.

13. The computer system of claim 12 wherein the Operating System is a Windows 2000 operating system.

14. The computer system of claim 13 wherein the storage medium is a hard disk drive.

15. The computer system of claim 9 wherein the application software component is a compiler component.

16. The computer system of claim 9 wherein the application software component is a word processing component.

17. The computer system of claim 9 wherein the application software component is a financial tracking component.

18. A computer-readable storage medium used in a computer system having a processor, memory associated with the processor and a storage device having a data storage medium, the computer-readable storage medium having instructions capable of being executed by the processor for performing the following:
   (a) accepting a file identifier corresponding to a data file, wherein the data file is not executable;
   (b) determining whether the file identifier is a URL and, if so, retrieving the data file from a remote server using the file identifier and, if not, retrieving the data file from the data storage medium using the file identifier; and
   an application located entirely at the computer system executing at the processor manipulating the data file before the data file has been completely retrieved from the remote server if it is determined that the file identifier is a URL,
   wherein said file identifier identifies executable code and retrieving the data file from a remote server comprises transmitting the file identifier and at least one parameter for executing the executable code.

\* \* \* \* \*